Patented Dec. 5, 1944

2,364,434

UNITED STATES PATENT OFFICE 2,364,434

DRILLING FLUID

James L. Foster, Houston, Tex., assignor to Standard Oil Development Company, a corporation of Delaware No Drawing. Application August 19, 1940,
Serial No. 353,245

6 Claims. (Cl. 252—8.5)

The present invention relates to drilling fluids and particularly to those fluids which have a salt water base.

In the drilling of oil wells with aqueous fluids, considerable difficulty is encountered by reason of loss of water by filtration into the formations penetrated. Considerable research has been done to develop addition agents which will reduce this loss by filtration. Among those which have been developed are gelatinized starch, natural gums which are capable of dispersion in water, various mosses, and meals produced from seeds which have substantial percentages of mucilaginous material. These materials have varying effects, both on reduction of water loss by filtration and on the viscosity of drilling fluids.

Among the best of the filtration reduction agents thus far developed is gelatinized starch. This agent, however, when used in amounts sufficient to effect the desired degree of reduction of water filtration, has a somewhat detrimental effect upon the viscosity of the drilling fluid. In many cases this detrimental effect, which takes the form of a reduction of viscosity, is of no particular moment. In many other cases, however, it is important to maintain the viscosity of the drilling fluid, and in these cases the use of starch is limited by the amount of reduction in viscosity which is permissible.

Ordinarily, the viscosity of aqueous drilling fluids is raised by the addition of certain colloidal clays. Naturally, in order to use the desired quantities of gelatinized starch, in cases where reduction in viscosity was not desired, the first thought was to add colloidal clay in order to maintain viscosity. It has been found, however, particularly in salt water muds, that the addition of this colloidal clay serves to defeat, at least in part, the purpose of adding the starch since, with the clay present, the amount of reduction of loss of water by filtration to be expected from the starch was not realized.

Gums, on the other hand, do not possess the tendency to seriously reduce the viscosity of the mud. As a matter of fact, when sufficient gum is used to effect the same amount of reduction in water loss by filtration as is attainable by gelatinized starch, the resulting viscosity of the mud is sometimes too high and difficulties in pumping are encountered.

It has now been found that the desired reduction in water loss by filtration can be attained, while avoiding the consequent reduction in viscosity attending the use of gelatinized starch, by using in conjunction with the starch a natural gum capable of being dispersed in water. Typical of such gums may be mentioned gum karaya, gum tragacanth, and ghatti gum. The important point about the conjoint use of these materials is that, when used together, they effect a greater reduction in water loss by filtration than could be effected by either one alone while, at the same time, they have no undesirable effect on the viscosity of the mud. In fact, by the use of these materials conjointly, a mud can be, so to speak, tailor-made since, by regulation of the proportions of the two, the desired reduction in water loss can be obtained and, at the same time, a desired viscosity can be maintained.

The above statements may be best illustrated by the following tables which tabulate the results of experiments conducted with different quantities of a natural gum and gelatinized starch in a drilling fluid. The base of the drilling fluid was a saturated NaCl solution, to which was added 20% by weight of a colloidal clay known in the art as El Paso clay. The gelatinized starch employed was one obtained by mixing 10% starch, 1% sodium hydroxide, and 89% water, all parts being by weight in the presence of steam. The gum employed was karaya gum used in the form of a powder. The experiments were performed by adding the addition agents in the amounts indicated to a measured sample of the mud and subjecting the mixture to pressure in a Baroid low pressure wall-building tester, described in Drilling Mud, May, 1938. In each case a 300-gram sample of the mixture was employed and 100 lbs. of pressure was applied. The viscosity of the sample after the addition agents were added was measured with a Stormer viscometer operated at 600 R. P. M. and is expressed in centipoises. The number of ccs. of water pressed out of the sample by the pressure in unit time was taken as a measure of the filtration characteristics of the sample.

In the first series of experiments a plurality of mud samples were made up by the addition of 0.3% by weight of gelatinized starch. One of these samples was examined as such, and to the others were added different amounts of karaya gum, ranging from 0.05% to 0.2% by weight, and these were examined separately. The results were as follows:

| Viscosity in grams, time | .3% S. C. 122 (35 cp.) | .3% S. C. .05% K. 148 (45 cp.) | .3% S. C. .1% K. 155 (48 cp.) | .3% S. C. .2% K. 177 (59 cp.) |
|---|---|---|---|---|
| 0 | | | | 0 |
| 1 | 6 | 3 | .6 | 3 |
| 4 | 16 | 9 | 5.0 | 5.4 |
| 9 | 26 | 15 | 9.2 | 7.6 |
| 16 | 38 | 22 | 13.0 | 9.6 |
| 25 | 49 | 28 | 16.8 | 11.6 |
| 30 | 61 | 34 | 20.2 | 12.6 |
| 36 | 66 | 37 | 21.8 | 13.6 |
|  | 73 | 40 | 23.8 | |

It will be noted in the blank sample, which was that containing only the starch, the water loss by filtration in 36 minutes was 73 ccs. The viscosity of this sample was 35 centipoises. The addition of 0.05% by weight of gum reduced the water loss to 40 ccs. and increased the viscosity to 45 centipoises. The addition of 0.1% of gum reduced the water loss to 23.8 ccs. and increased the viscosity to 48 centipoises. The addition of 0.2% gum decreased the water loss to 13.6 ccs. and increased the viscosity to 59 centipoises. This last water loss is lower than could be attained by the addition of 0.5% by weight of either gelatinized starch or the gum. In the case of the former, the resulting viscosity would be considerably below 35 centipoises, while in the case of the latter, the resulting viscosity would be considerably above 59 centipoises.

A similar set of experiments was run employing 0.5% by weight of gelatinized starch in the mud samples and using the same amounts of gum in the different samples. The results were as follows:

| Viscosity in grams, time | .5% S. C. 100 (23 cp.) | .5% S. C. .05% K. 110 (27 cp.) | .5% S. C. .1% K. 130 (37 cp.) | .5% S. C. .2% K. 160 (51 cp.) |
|---|---|---|---|---|
| 1 | 1.8 | 1.4 | 1.4 | 1.4 |
| 4 | 4.6 | 3.4 | 3.4 | 3.0 |
| 9 | 7.6 | 5.6 | 5.2 | 5.6 |
| 16 | 10.4 | 7.6 | 7.2 | 6.0 |
| 25 | 13.2 | 9.8 | 9.2 | 7.4 |
| 30 | 14.4 | 10.6 | 9.9 | 8.0 |
| 36 | 16.0 | 11.6 | 10.9 | 8.8 |

Here, again, it will be noticed that in each case the addition of the gum decreased the water loss by filtration obtained with the starch and, at the same time, caused an increase in the viscosity. In this case also the final water loss of 8.8 ccs. in 36 minutes with 0.5% of starch and 0.2% of gum was less than that obtainable with 0.7% by weight of either starch or gum. This will be brought out in the next table. In this connection, it will be noted that the water loss in 36 minutes with 0.5% of starch was 16 ccs., as compared with a loss of 13.6 ccs. with 0.3% of starch and 0.2% of gum.

The next set of experiments was exactly the same, except that in each case 0.7% by weight of starch was employed.

| Viscosity in grams, time | .7% S. C. 85 (15 cp.) | .7% S. C. .05% K. 102 (23 cp.) | .7% S. C. .1% K. 107 (26 cp.) | .7% S. C. .2% K. 155 (48 cp.) |
|---|---|---|---|---|
| 0 | 0.0 | 0.0 | 0.0 | 0.0 |
| 1 | .8 | 1.0 | 1.4 | 1.4 |
| 4 | 2.6 | 2.4 | 2.0 | 2.2 |
| 9 | 5.0 | 4.0 | 3.6 | 3.2 |
| 16 | 7.4 | 5.6 | 5.2 | 4.4 |
| 25 | 9.6 | 7.2 | 6.6 | 5.4 |
| 30 | 10.6 | 7.8 | 7.2 | 5.8 |
| 36 | 11.6 | 8.6 | 8.0 | 6.4 |

It will be noted that the water loss at the end of 36 minutes with 0.7% of starch was 11.6, as compared with 8.8 ccs. loss with 0.5% of starch and 0.2% of gum. In this case the reduction of water loss by the subsequent addition of gum follows the same course as is the previous experiments. It will be noted that 0.7% of starch and 0.2% of gum gave a water loss in 36 minutes of 6.4 ccs., which is less than would have been obtained with 0.9% by weight of either starch or gum.

Additional experiments were run, in one of which starch alone was used, and in the other of which a corresponding amount of a mixture of starch and gum were used. In the first case, 1% by weight of starch was used, and in the second case, 0.7% by weight of starch and 0.3% by weight of gum were used. The viscosity of the first mixture was 15 centipoises, and that of the second mixture was 63 centipoises. The water loss by filtration on the first sample at the end of 36 minutes was 9 ccs., and the water loss on the second sample at the end of 36 minutes was 5.2 ccs.

From the above specific examples it will be seen that the effect obtained by the conjoint use of starch and gum is one that persists throughout a fairly wide range of amounts of these addition agents. In general, it is preferred to use such amounts of the respective addition agents that their combination will not substantially exceed 1% by weight of the drilling fluid, although combined amounts up to 3% may be used in special cases. Likewise, as indicated in the above tables, combined amounts of as low as 0.35% constitute an improvement over the use of either alone.

It may be said in general that in the conjoint use of these materials, their relative proportions are so selected as to give the desired viscosity to the drilling fluid. In usual cases, this will mean that a smaller amount of gum than starch will be employed. It is not intended, however, to make any fixed rule in this respect, since the relative proportions employed will depend upon the particular mud and the particular requirements of the job on which the mud is being used.

In the appended claims, whenever the word "brine" is employed it is used in the broad sense to designate a strong water solution of any water-soluble salt. As is known in the drilling of wells, not only are beds of common salt (NaCl) encountered, but also beds containing large quantities of other water-soluble salts, such as calcium salts, which, for many years, have been known to have an even more detrimental effect on the colloidal properties of a drilling fluid than common salt. In the art of drilling oil wells, a strong solution of any of these naturally occurring salts is commonly referred to as brine.

The nature and objects of the present invention having been thus described and illustrated, what is claimed as new and useful and is desired to be secured by Letters Patent is:

1. A method for controlling water loss by filtration, as well as the viscosity, of a drilling fluid having a brine base, which comprises adding to the drilling fluid a small amount by weight of gelatinized starch effective to reduce substantially the water loss by filtration from the drilling fluid and a natural gum capable of dispersion in water, the combined quantity of starch and gum being sufficient to maintain water loss from said drilling fluid by filtration at a desirably low level and the amount of gum being sufficient to maintain the viscosity of the resultant drilling fluid substantially above that which would obtain if the level of water loss by filtration were maintained at the selected level by the effect of starch alone.

2. A method according to claim 1 in which the combined amounts of addition agents added do not constitute substantially more than 1% by weight of the drilling fluid.

3. A method according to claim 1 in which the amount of starch added is in excess of the amount of gum.

4. A drilling fluid comprising salt water carrying in suspension a small amount by weight of gelatinized starch effective to reduce substantially the water loss by filtration from the drilling fluid and a natural gum capable of dispersion in water the combined quantity of starch and gum being sufficient to maintain the tendency of the drilling fluid to lose water by filtration at a desirably low level and the amount of gum being sufficient to maintain the viscosity of the resultant drilling fluid substantially above that which would obtain if the tendency of the fluid to lose water by filtration were maintained at the selected level by the addition of starch alone.

5. A drilling fluid according to claim 4 in which the combined starch and gum constitute not substantially more than 1% by weight of the drilling fluid.

6. A drilling fluid comprising a suspension of clay in salt water containing gelatinized starch in an amount sufficient to reduce substantially the tendency of the drilling fluid to lose water by filtration and a natural gum capable of dispersion in water, said two agents constituting, together, not substantially more than 1% by weight of the drilling fluid the combined quantity of starch and gum being sufficient to maintain the tendency of the drilling fluid to lose water by filtration at a desirably low level and the amount of gum being sufficient to maintain the viscosity of the resultant drilling fluid substantially above that which would obtain if the tendency of the fluid to lose water by filtration were maintained at the selected level by the addition of starch alone.

JAMES L. FOSTER.